No. 812,414. PATENTED FEB. 13, 1906.
F. EGERSDÖRFER.
ROTARY ENGINE.
APPLICATION FILED NOV. 7, 1905.

Witnesses:

Inventor:

UNITED STATES PATENT OFFICE.

FRITZ EGERSDÖRFER, OF WIESBADEN, GERMANY, ASSIGNOR OF ONE-HALF TO FRITZ LINDER, SR., OF BARMEN, GERMANY.

ROTARY ENGINE.

No. 812,414.  Specification of Letters Patent.  Patented Feb. 13, 1906.

Application filed November 7, 1905. Serial No. 286,305.

*To all whom it may concern:*

Be it known that I, FRITZ EGERSDÖRFER, a citizen of the German Empire, residing at Wiesbaden, in the Province of Hesse-Nassau and Kingdom of Prussia, Germany, have invented certain new and useful Improvements in Rotary Engines, of which the following is a specification.

This invention relates in special to a new tightening device for rotary engines; and it has for its object to insure an absolute tight joint between the bearing-surface of the rotary piston and the surface of the hollow casing (the cylinder) on which the piston rests between the inlet and outlet ports, so as to avoid any escape of steam or other pressure medium used through this surface. The device is composed of several single tightening-bars which are embedded in grooves of the cylinder and which are pressed outward—that is, against the piston—by springs which are coupled outside of the cylinder, so that they must always act conjointly. This coupling of the springs and tightening-bars prevents the undue projection of each one of them into the cylinder-space, so that it might be spoiled or might suffer when the piston-plate slides over the same.

Figure 1:
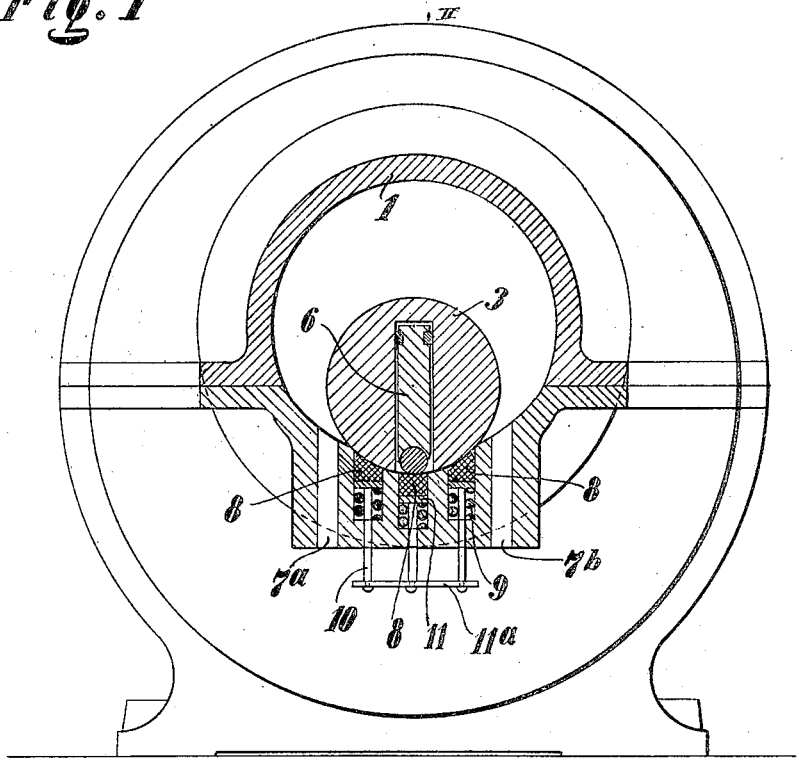
Figure 2:
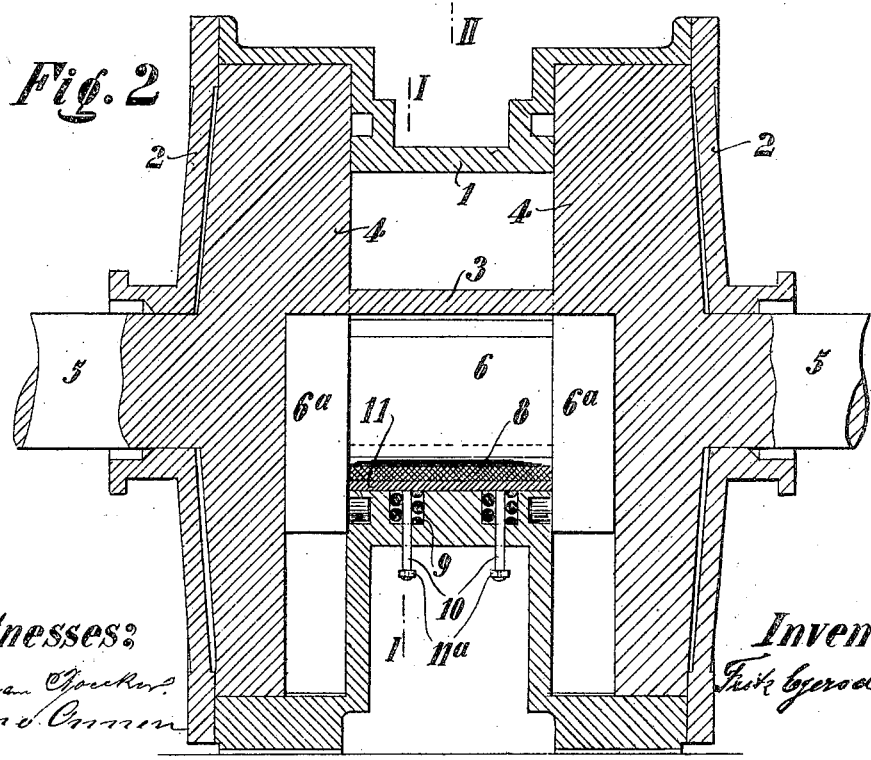

On the accompanying drawings the new device is shown in a cross-section of the machine in Figure 1 along line I I of Fig. 2 and in Fig. 2 in a longitudinal section along line II II of Fig. 1.

By 1 is indicated the cylinder of the engine. 2 represents the cylinder-covers, in which the engine-shaft 5 is journaled, and rigidly connected to this shaft or made in one piece with it is the piston-drum 3 and the two strong disks 4. In the example shown one piston-plate 6 is used, which is held movable axially in a groove in the drum 3, and extensions $6^a$ thereof are guided right and left in the disks 4. By these the power exerted upon the piston-plate is transmitted to the shaft 5. The drum 3 is held eccentrically to the boring of the cylinder. It rests on the circumference of the latter between the inlet and outlet ports $7^a$ and $7^b$, respectively. At this place of connection between the drum 3 and the cylinder the circumference of the latter is for a certain width of the periphery shaped concentrically with the drum, forming a little concavity in the cylinder. Now in order to attain a close and tight joint at this place between the two surfaces touching or bearing upon each other bars 8 are embedded in grooves cut axially into the cylinder, and these bars are pressed against the circumference of the drum by springs 9. These springs bear with one end against the wall of the cylinder and with the other end against bars 11, placed between them and the bars 8, and they surround rods 10, fixed to the bars 11 and passing to the outside of the cylinder, where they are joined to cross-bars $11^a$, so that they all must work together and none of the tightening-bars 8 can be pressed outwardly independently of the other.

Having now explained the nature of my invention, I declare that what I claim, and wish to secure by Letters Patent, is—

In a rotary engine a drum 3, disks 4 right and left of the same, a cylinder 1 and covers 2 inclosing said drum and disks, shafts 5 connected to the disks 4 and journaled in said covers 2, a piston-plate 6 held radially movable in the drum 3, in combination with tightening-bars 8 embedded in corresponding grooves in the cylinder 1, pressure-bars 11 below said tightening-bars 8, bolts 10 fixed to said bars 11 and passing to the outside of the cylinder 1, springs 9 laid round said bolts and pressing the pressure-bars 11 together with the tightening-bars inwardly against the drum 3, cross-bars $11^a$ holding the bolts 10, and the bars 11 together, the whole as described and illustrated and for the purpose set forth.

In testimony whereof I have affixed my signature in presence of two witnesses.

FRITZ EGERSDÖRFER.

Witnesses:
 FRIEDRICH LINDER, SR.,
 CARL LINDER.